United States Patent [19]

Hiatt et al.

[11] 3,925,319

[45] Dec. 9, 1975

[54] LIGHT-STABLE THERMOPLASTIC POLYURETHANES

[75] Inventors: Norman A. Hiatt, Hamden; Harold G. Wolf, Waterbury; Robert A. Hlavacek, Stratford, all of Conn.

[73] Assignee: Uniroyal, Inc., New York, N.Y.

[22] Filed: Sept. 19, 1973

[21] Appl. No.: 398,733

[52] U.S. Cl. ............ 260/75 NT; 117/161; 161/190; 260/2.5 AT; 260/2.5 AQ; 260/75 NQ; 260/77.5 AT; 260/77.5 SS
[51] Int. Cl.² C08G 18/76; C09D 3/72; B32B 27/40
[58] Field of Search... 260/2.5 AQ, 75 NT, 77.5 AT

[56] References Cited
UNITED STATES PATENTS

| | | | |
|---|---|---|---|
| 2,929,800 | 3/1960 | Hill | 260/77.5 AM |
| 3,554,962 | 1/1971 | Fischer | 260/77.5 AT |
| 3,663,514 | 5/1972 | Campbell et al. | 260/75 NT |
| 3,730,919 | 5/1973 | McGinn | 260/2.5 AQ |
| 3,790,508 | 2/1974 | Triolo | 260/75 NT |

*Primary Examiner*—H. S. Cockeram
*Attorney, Agent, or Firm*—James J. Long

[57] ABSTRACT

One-shot thermoplastic polyurethanes stable to discoloration by light are made by reacting a polyol with a mixture of aromatic and aliphatic polyisocyanates. For example, polytetramethylene ether glycol and 1,4-butanediol may be reacted with a mixture of methylenebis(p-phenylisocyanate) and methylenebis(4-cyclohexylisocyanate) in the presence of stannous octoate in a one shot procedure to form a thermoplastic suitable for coating fabric.

9 Claims, No Drawings

LIGHT-STABLE THERMOPLASTIC POLYURETHANES

This invention relates to a one-shot thermoplastic polyurethane composition and method of making same.

Conventional polyurethane compositions (polyol-polyisocyanate reaction products) unfortunately do not always have good light stability but frequently discolor when exposed to light. Polyurethanes based on aromatic isocyanate ordinarily have particularly poor light stability, while polyurethanes based on aliphatic isocyanates usually afford good resistance to discoloration upon exposure to light. However, it is not always convenient or desirable or economical to base a polyurethane on an aliphatic isocyanate; polyurethanes based on aliphatic isocyanates frequently are deficient in tensile strength, solubility, or processing characteristics.

U.S. Pat. No. 3,554,962, Fischer, Jan. 12, 1971, discloses light stable polyurethane composition based on a mixture of a polyurethane prepolymer made from an aromatic diisocyanate and a polyurethane prepolymer made from the aliphatic diisocyanate, 4,4-methylenebis (cyclohexylisocyanate); these blended prepolymers show good color retention on fadeometer aging. The present invention is based on the unexpected discovery that it is not necessary to prepare two separate polymers. In this invention a surprising synergistic benefit is obtained in a single polyurethane, by employing the aromatic and aliphatic isocyanates in admixture, in preparing the polyurethane in one-shot thermoplastic form.

U.S. Pat. No. 3,706,710, Camilleri et al., Dec. 19, 1972, discloses polyurethane prepolymers made by first reacting a polyol with an aromatic polyisocyanate and thereafter completing the reaction with an aliphatic polyisocyanate. The patent specifically states that using a mixture of an aromatic polyisocyanate and an aliphatic polyisocyanate is not as effective in producing discoloration resistant polyurethane coating compositions as sequential reaction of polyisocyanates. The present invention is based on the discovery that by going directly contrary to this teaching, in a one-shot thermoplastic system, remarkable light stability can be achieved.

British Pat. No. 1,234,972, Farbenfabriken Bayer, June 9, 1971, describes a two-component lacquer coating in which one component is a polyhydroxy compound and the other component is an isocyanate copolymer made by reacting an aromatic polyisocyanate and an aliphatic polyisocyanate together in a solvent using suitable catalysts. When the two components are combined, the resulting cured system is said to produce good color stability.

Frisch et al., "Effect of Isocyanate Variation on Physical and Environmental Properties of Mositure-Cure Urethane Coatings", J. Paint Technology 42, No. 547, page 461 (1970), describes prepolymers which are prepared by reacting a 50/50 mixture of the araliphatic diisocyanate, xylylene diisocyanate, and toluene diisocyanate with various polyols. These prepolymers are then moisture cured. The authors indicate that the resistance to yellowing of these materials after aging in the fadeometer for 200 hours is comparable to moisture-cured prepolymers based on xylylene diisocyanate alone providing that stabilizers are used. The present invention is based on the surprising discovery that synergistic improvement in color stability is provided by using a mixture of aromatic and aliphatic diisocyanate in a one-shot thermoplastic system.

In one aspect, this invention is concerned with the preparation of novel one-shot polyurethane thermoplastics using a macropolyol, a low molecular weight polyol chain extender, and a mixture of aliphatic and aromatic polyisocyanates, hereafter referred to as aliphatic-aromatic polyurethanes. These new products show substantially better stability than a mechanical mixture of an aromatic polyisocyanate based polyurethane thermoplastic, hereafter referred to as an aromatic polyurethane, and an aliphatic polyisocyanate based polyurethane thermoplastic, hereafter referred to as an aliphatic polyurethane, containing the same proportions of the polyisocyanate components as the aliphatic-aromatic system of the invention. While the light stability of the aliphatic-aromatic polyurethane falls in between the aliphatic polyurethane and the aromatic polyurethane, it is much closer in behavior to the aliphatic polyurethane, and thus a synergism is in evidence.

The aliphatic-aromatic polyurethanes of the invention are useful for coated-fabrics applications and other coatings applications where light stability is desirable. In addition, formulations of the type described for the aliphatic-aromatic polyurethane thermoplastics may be adapted to the preparation of light-stable foams.

The invention accordingly typically deals with the preparation of aliphatic-aromatic polyurethane thermoplastics by a one-shot technique using three components, namely, (1) a macropolyol (frequently a macroglycol), (2) a low molecular weight polyol chain extender and (3) a mixture of aromatic polyisocyanate and aliphatic polyisocyanate (ordinarily aromatic and aliphatic diisocyanates). The process typically involves combining the macroglycol and chain extender and removing moisture, for example by vacuum stripping this mixture at 100°C for 1 hour. To this mixture is added the polyisocyanate mixture in the presence of a suitable catalyst and with vigorous stirring. The temperature is typically kept within the range of from 25°C to 200°C. After several minutes of mixing time, the product is poured into a mold and the reaction is allowed to go substantially to completion, thereby providing the thermoplastic composition of the invention. In view of the fact that the rate of reaction of aromatic isocyanate with a polyol is very much greater than the rate of reaction of aliphatic isocyanate, it is indeed surprising and unexpected that a highly useful homogeneous product is formed in the present process.

The expression "one-shot thermoplastic polyurethane" is used herein in its conventional sense to denote a polyurethane which is made by combining the ingredients in one reaction mixture, to produce a product (essentially devoid of unreacted isocyanate groups) which is soluble and fusible, and can be shaped by the methods ordinarily employed for thermoplastic materials without requiring addition of curing or cross linking agent, or any curing cycle at elevated temperature, to develop its physical properties; it can therefore be shaped rapidly and economically, and scrap can be recycled. This is in contrast to prepolymer types of polyurethane, which contain unreacted isocyanate groups; they require addition of a curing or cross linking agent and involve a curing cycle in the shaping operation to develop desired physical properties.

The macropolyol (which may be macroglycol) employed in the invention may be any conventional macropolyol suitable for preparing thermoplastic polyurethane, whether of the polyether type, or polyester type (including combinations thereof). The macropolyol usually has an equialent weight of 100 to 3000, preferably in the 500–2000 range. Frequently the macropolyol has an hydroxyl number of 20–600, preferably 30–120 (particularly for polyurethanes useful for coating fabrics).

The polyether types of macropolyols include, as is well known to those skilled in the art, poly(oxyalkylene) glycols [e.g. poly(oxyethylene) glycol, poly(oxypropylene) glycol, poly(oxytetramethylene) glycol, etc.] and higher polyether polyols, such as triols [e.g. poly(oxypropylene) triol], including polyether polyols of higher functunality than three [e.g., poly(oxypropylene adducts of pentaerythritols), poly(oxypropylene adducts of sorbitol)] particularly for certain light stable foam preparations. Mention may be made of such polyether polyols as poly(oxypropylene)-poly(oxyethylene)glycol, poly(oxypropylene) adducts of trimethylol propane, poly(oxypropylene)-poly(oxyethylene) adduct of trimethylolpropane, poly(oxypropylene) adducts of 1,2,6-hexanetriol, poly(oxypropylene)-poly(oxyethylene) adducts of ethylenediamine, poly(oxypropylene) adducts of ethanolamine, and poly(oxypropylene) adducts of glycerin.

The polyester types of macropolyols are likewise well known in the art and require no detailed description here. It will be understood that they include chain extended polyesters made from a glycol (e.g., ethylene and/or propylene glycol) and a saturated dicarboxylic acid (e.g., adipic acid). By way of non-limiting example there may be mentioned poly(ethylene adipate) glycol, poly(propylene adipate) glycol, poly(butylene adipate) glycol, poly(caprolactone) glycol, poly(ethylene adipatephthalate) glycol, poly(neopentyl sebacate) glycol, etc. Small amounts of tri-alcohols such as trimethylolpropane or trimethylolethane may be included in the polyester preparation. Polyester polyols with functionalities of three or more [e.g., glycerides of 12-hydroxystearic acid] are of particular interest where light-stable foams are desired. Suitable polyester polyols include those obtainable by reacting any of the compounds mentioned hereinbelow under chain extenders with such dicarboxylic acids as adipic acid, succinic acid, glutaric acid, azelaic acid, sebacic acid, malenic acid, maleic acid, fumaric acid, phthalic acid, isophthalic acid, terephthalic acid, tetrachlorophthalic acid, and chlorendic acid; the acid anhydrides and acid halides of these acids may also be used.

With respect to the polyisocyanates employed in the invention, the term "aliphatic polyisocyanate" is intended to include open chain, cycloaliphatic and aralipathic polyisocyanates. Examples of aliphatic polyisocyanates which may be used are tetramethylene-1,4-diisocyanate, hexamethylene1,6-diisocyanate, 1-methyl-2,4- and 1-methyl-2,6-diisocyanatocyclohexane and mixtures thereof, p-xylylene diisocyanate and m-xylylene diisocyanate (XDI) and mixtures thereof, 4,4'-diisocycnato-dicyclohexyl-methane, isophorone diisocyanate, 2,2,4- and 2,4,4-trimethylhexamethylene diisocyanate or any other aliphatic polyisocyanates which are conventionally employed in the polyurethane art.

Similarly, as the aromatic polyisocyanate component of the composition of the invention, any aromatic polyisocyanate conventionally employed in polyurethane preparation may be used. These include, by way of non-limiting example, such aromatic polyisocyanates as 2,4-toluene diisocyanate and 2,6-toluene diisocyanate and mixtures thereof (TDI), 4,4'-diphenylmethane diisocyanate (MDI), p-phenylene diisocyanate, 2,4,6-tolylene triisocyanate, 4,4',4"-triphenylmethane triisocyanate, 2,2-bis(p-isocyanato-phenyl)-propane, and the like.

As indicated, a chain extender is also employed in the preparation of the thermoplastic polyurethane. Any chain extender conventionally employed for this purpose may be used in the invention. Thus, suitable chain extenders include the low molecular weight polyols (as distinguished from the macropolyols described above), especially diols or triols, as represented by 1,4-butanediol, hydroquinone bis(2-hydroxyethyl) ether, ethylene glycol, diethylene glycol, triethylene glycol, propylene glycol, dipropylene glycol, hexylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,2-cyclohexanediol, 1,2-dimethyl-1,2-cyclohexanediol, glycerol, trimethylol propane, trimethylol ethane, 1,2,4-butanetriol, 1,2,6-hexanetriol, pentaerythritol, dipentaerythritol, tripentaerythritol, anhydroaneaheptitol, mannitol, sorbitol, methylglucoside, and the like.

In preparing the thermoplastic polyurethane the polyols and polyisocyanates are employed in such proportions as to provide an overall NCO/OH ratio in the range of from 0.95/1 to 1.15/1, preferably from 1/1 to 1.1/1. The equivalence ratio of aromatic to aliphatic isocyanate falls in the range of from 10/90 to 90/10, preferably 25/75 to 90/10, most preferably 40/60 to 75/25. The equivalence ratio of chain extender to macropolyol falls in the range of from 1/1 to 2/1.

As in conventional practice, the polyurethane forming reaction may be catalyzed by the catalysts ordinarily used in this art. Examples of catalysts which may be used are stannous octoate, dibutyltin dilaurate, tetramethylbutanediamine, triethylamine and combinations of amine and tin catalysts or any other suitable catalyst systems which will be apparent to those skilled in the art. Other modifying ingredients may also be present in the reaction mixture if desired. Thus, a very small amount of a monofunctional alcohol is frequently useful as a molecular weight regulator ("Preparation of Elastomeric Polyurethane Solutions in Presence of a Chain Stopper", Japanese Pat. No. 16,386 (1969) to Kurashiki Rayon Co., Ltd.).

The reaction used to prepared the one-shot aliphatic-aromatic polyurethane thermoplastics of the invention may be conducted in the temperature range of 25°C to 200°C, preferably 50°C to 150°C. Usually the reactants are preheated and upon being combined an exothermic reaction sets in. In the initial stage the reaction mixture is usually agitated, and typically after a few minutes, the reaction is usually subsequently conveniently finished off under static conditions, for example by heating in a mold (e.g., for about ¼ hour or less to about 1 hour or more). Physical properties may be further developed after standing overnight at room temperature (polyurethanes do not generally develop their full properties right away but may take several weeks to do so). Although the completion of the reaction is usually referred to as a "cure", it will be understood that the product is a soluble, thermoplastic material nevertheless.

The product is usually diced or otherwise divided for use in fabric coating by calendering or solution techniques.

In order to obtain the maximum light stability out of the aliphatic-aromatic polyurethane thermoplastics, stabilizers may be used. These stabilizer systems usually involve combinations of both an ultraviolet absorber and an antioxidant. Examples of suitable ultraviolet absorbers are 2-(2'-hydroxy-3',5'-di-t-butylphenyl)-5-chloro-1,2,3-benzotriazole (Tinuvin 327; trademark), 2-(2'-hydroxy-5-methylphenyl) benzotriazole (Tinuvin P; trademark) and 2-hydroxy-4-methoxy-benzophenone (Cyasorb U.V.9; trademark) or other ultraviolet absorbers which will be apparent to those skilled in the art.

The ultraviolet absorber is frequently present in the range of ¼ to 2% by weight of the total polyurethane composition. The antioxidant is ordinarily present in the range of ½ to 2% by weight of the total polyurethane composition.

Examples of suitable antioxidants are 2,2-methylenebis(4-methyl-6-nonylphenol), tetrakis (methylene-beta-(3,5-di-t-butyl-4-hydroxyphenyl) propionate) methane (Irganox 1010; trademark) and tris(-nonylphenyl) phosphite or any other suitable antioxidants known to those skilled in the art.

To adapt the invention to the manufacture of foamed polyurethane, the polyol and polyisocyanates may be mixed and reacted in the usual way in admixture with blowing agent of the kind conventionally employed in making polyurethane foam and any suitable desired auxiliary ingredients such as surfactants, catalysts, chelating agents, etc.

Detailed working examples below, as summarized in Table I, compare one-shot aliphatic-aromatic polyurethane thermoplastics of the present invention with polyurethanes prepared from either aromatic or aliphatic polyisocyanates or mechanical mixtures thereof, as well as polyurethane prepolymers employing mixtures of aromatic and aliphatic polyisocyanates. This comparison is carried out on samples in the aged and unaged states with regard to color change by determining yellowness index parameters with a Gardner color difference meter. The results are then used to calculate yellowness indices according to ASTM D-1925-63T. The difference in yellowness index (DY in Table I), between samples after aging for 200 hours at room temperature in a fluorescent-black light apparatus, and unaged samples are listed in relation to the equivalence ratio of aromatic to aliphatic isocyanate contents (fourth column in Table I). Polymers prepared include those based solely on an aliphatic polyisocyanate, methylenebis(4-cyclohexylisocyanate) (also known as "hydrogenated MDI" herein abbreviated as "HMDI") or an aromatic polyisocyanate, methylenebis(p-phenylisocyanate) (herein abbreviated as "MDI"). In addition, polyurethanes containing mixtures of various aromatic and aliphatic polyisocyanates are exemplified. The "predicted" DY values are obtained from the straight line function between the lowest value of the polyurethanes containing only the respective aliphatic polyisocyanate, and the highest value of the polyurethanes incorporating only the respective aromatic polyisocyanate. The smaller the change in yellowness index the less the yellowing that occurred upon aging.

As stated earlier, the one-shot aliphatic-aromatic thermoplastic polyurethanes of the invention show light stability which falls in between the aliphatic polyurethane and the aromatic polyurethane. However, a synergistic effect is apparent because the behavior of the polymers of this invention is much closer to that of the aliphatic polyurethane. This is evident in Table I by comparing the change in yellowness index values of aliphatic-aromatic polyether polyurethanes (Examples 2, 3, 4 and 5), with the aromatic and aliphatic polyether polyurethanes (Examples 6 and 1) respectively. In every instance, the polyether polyurethanes made from mixtures of aromatic and aliphatic polyisocyanates exhibit a DY value substantially below the predicted values, particularly where aromatic to aliphatic polyisocyanate ratios of from 25/75 to 90/10 are concerned. The same unexpected results are obtained from polyurethanes based on polyester polyols (Example 12 versus control Examples 11 and 13).

The differences in DY values between the polyurethane compositions of the invention and those of the mechanical mixtures of comparable isocyanate contents are expecially pronounced and further demonstrate the unexpected results obtained following the teaching of this invention. As a matter of fact it will be noted that the DY values of the mechanical blends fall in most cases considerably above the predicted values and therefore such blends represent inferior products. As shown by Examples 7-10 and 14 (mechanical mixtures) this holds true not only for polyether but also for polyester type polyurethanes.

The substantial superiority of the polyurethanes of the invention over the corresponding moisture-cured polyurethane prepolymers is exemplified by Example 3 (invention) vs 17 (control): the improvement in light stability amounts to essentially 80%. Even a comparison study using different aromatic and aliphatic polyisocyanates, namely TDI and XDI respectively, indicates the unexpected improvement of about 50% (Example 15, invention, vs 17, control). Similar results are obtainable using amine-type curing agents for the prepolymers instead of moisture.

Following the general teaching and claims of U.S. Pat. No. 3,706,710 (Camilleri et al.) a prepolymer (MDI/HMDI ratio 40/60) was moisture cured (Example 18) resulting in a product having a DY value substantially higher than that of the polyurethane thermoplastics of Example 2 (MDI/HMDI ratio 25/75) and 3 (MDI/HMDI ratio 50/50).

Example 19 was carried out duplicating Example 1 of above U.S. Pat. No. 3,706,710. The product obtained was a gummy, sticky and useless material which even after having been exposed to moisture for 14 days did not change its consistency. It was not possible to carry out any meaningful tests e.g. aging for 200 hours in the fluorescent black light apparatus.

Another important consideration regarding physical properties of polyurethane polymers is their retention of tensile strength upon aging. Referring to Table I one will appreciate the fact that the polyurethanes of the invention not only show considerable superiority in retention of tensile over their corresponding mechanical blends but also with respect to their corresponding prepolymers. In particular, Examples 2, 3, 4 and 12 of the invention may be compared to the controls 7, 8, 9 and 14 as well as example 17 (prepolymer). Generally, the tensile retention values of the polyurethanes of the invention exceed those of the control polymers, an average of about 40%.

In addition to being useful as coatings for fabrics, the one-shot thermoplastic polyurethanes of the invention are applicable to making automotive parts and sight shields, bumpers, crash pads, and to making foams and paints.

The products prepared according to the invention may range from soft and elastomeric to hard and rigid materials depending on the functionalities and molecular weights of the ingredients used.

The following examples will serve to illustrate the practice of the invention in more detail.

EXAMPLES 1–6

This series of examples, which is summarized in Tables I and II along with additional examples, compares a one-shot thermoplastic polyether polyurethane prepared solely from aliphatic diisocyanate and a one-shot thermoplastic polyether polyurethane prepared solely from aromatic diisocyanate, with one-shot thermoplastic polyether polyurethanes of the invention prepared with both an aliphatic and an aromatic diisocyanate, from the standpoint of resistance to yellowing and retention of original tensile strength upon light aging.

Example 1 is outside the invention and is a control employing solely the aliphatic diisocyanate, methylenebis(4-cyclohexylisocyanate), also known as hydrogenated MDI, herein abbreviated as HMDI. Example 6 is likewise outside the invention and is a control employing solely the aromatic diisocyanate, methylenebis(p-phenylisocyanate), herein referred to as MDI.

Examples 2–5 represent the practice of the invention and employ varying equivalence ratios of the aromatic to the aliphatic diisocyanate, ranging from 25/75 to 90/10 (column 4 of Table I).

The procedure for Example 2, which is typical of the one-shot process of the invention, is as follows:

To 274.4 g of PTMG [poly(oxytetramethylene)-glycol, hydroxyl number 112] are added 22.3 g of 1,4-butanediol (abbreviated 1,4BD in Table II) and 2.2 g of monofunctional aliphatic alcohol (abbreviated MFA in Table II) as a molecular weight regulator (e.g., tetradecanol). To remove moisture from the mixture it is heated in a vacuum oven (about 5 mm Hg) at 100°C for one hours. The mixture is removed from the vacuum oven and heated to 140°C and 3 drops of a stannous octoate catalyst (T-9, trademark), are added. Then 34.4 g of MDI and 108.1 g of HMDI (giving an equivalence ratio of aromatic to aliphatic diisocyanate of 25/75) are heated to about 55°–60°C and charged to the polyol mixture while agitating. The ensuing chemical reaction causes the temperature of the mixture to rise to 190°C within about 1 minute at which time the still liquid product is poured into a mold which has been preheated to about 140°C. The mold and its contents are exposed to a temperature of 140°C for an additional one-half hour in an oven, and then kept at room temperature for about 24 hours.

100 g of the resulting solid thermoplastic product, 1 g of ultraviolet absorber (Tinuvin 327) and 0.5 g of antioxidant (Irganox 1010) are dissolved in 300 g of solvent mixture (70% tetrahydrofuran - 30% cyclohexanone). The solution is poured on release paper and passed through a set of steel rollers which are gapped to give a polymer film thickness of about 3 mils after evaporation of the solvent (which is accomplished by heating in an oven at 65°C for 15 minutes followed by 120°C for 15 minutes). The resulting thermoplastic film is evaluated for light stability and tensile strength retention with the results shown in Table I.

To determine light stability, a Gardner color difference meter is used to measure yellowness in film samples aged 200 hours at room temperature in a fluorescent-sunlight-black light apparatus, as compared to unaged samples. The yellowness index is then calculated according to ASTM D-1925-63T. The observed difference in yellowness index before and after aging, designated DY, is given in Table I. The smaller the change (DY) in yellowness index, the less the yellowing that occurred upon aging. Along with the observed DY, Table I gives a predicted DY value, which is obtained from the straight line function between the value for a polyurethane containing only the aliphatic diisocyanate (lowest value) and the value for a polyurethane incorporating only the aromatic diisocyanate (highest value).

Examples 3, 4, 5 employ the same one-shot procedure as Example 2, except for the amounts of diisocyanates, which are given in Table II; in Examples 1 and 6 (controls) the procedure is likewise the same except that a single diisocyanate is used.

A synergistic improvement in resistance to yellowing is demonstrated in the thermoplastic aliphatic-aromatic polyether polyurethanes of the invention represented by Examples 2, 3, 4 and 5 of Table I, as compared to the aromatic and aliphatic polyether polyurethanes (Examples 6 and 1, respectively). In each of Examples 2, 3, 4 and 5 the observed DY value is substantially below the predicted value. The improvement realized in the observed value as compared to the predicted value is expressed as a percentage in column seven of Table I.

TABLE I

| Ex. No. | Polyurethane Type | Process Type | Equivalence Ratio | Predicted DY | Observed DY | %Improved | Retention of Tensile, % |
|---|---|---|---|---|---|---|---|
| 1 | Polyether | 1-shot | HMDI Only | 2.3 | 2.3 | — | 81.7 |
| 2 | " | " | 25/75 | 6.4 | 4.0 | +37.5 | 79.0 |
| 3 | " | " | 50/50 | 10.2 | 5.4 | +47.0 | 69.7 |
| 4 | " | " | 75/25 | 14.0 | 8.6 | +38.6 | 54.3 |
| 5 | " | " | 90/10 | 16.2 | 11.0 | +31.5 | — |
| 6 | " | " | MDI Only | 18.0 | 18.0 | — | 40.0 |
| 7 | " | Mechanical Blend | 25/75 | 6.4 | 11.9 | −86.0 | 48.2 |
| 8 | " | " | 50/50 | 10.2 | 12.3 | −20.6 | 48.0 |
| 9 | " | " | 75/25 | 14.0 | 14.0 | 0 | 41.4 |
| 10 | " | " | 90/10 | 16.2 | 16.2 | 0 | — |
| 11 | Polyester | 1-shot | HMDI Only | 5.6 | 5.6 | — | 84.1 |
| 12 | " | " | 50/50 | 13.3 | 9.3 | +30.0 | 71.8 |
| 13 | " | " | MDI Only | 20.9 | 20.9 | — | 65.3 |
| 14 | " | Mechanical | 50/50 | 13.3 | 16.1 | −21.1 | 58.0 |

TABLE I-continued

| Ex. No. | Polyurethane Type | Process Type | Equivalence Ratio | Predicted | DY Observed | %Improved | Retention of Tensile, % |
|---|---|---|---|---|---|---|---|
| 15 | Polyether | Blend 1-shot | 50/50 | — | 11.3 | — | — |
| 16 | " | Pre-polymer | 50/50 | — | 21.1 | — | — |
| 17 | " | " | 50/50 | — | 26.0 | — | 44.2 |
| 18 | " | " | 40/60 | — | 22.2 | — | — |
| 19 | Polyester | " | 25/75 | — | — | — | — |

TABLE II

| Example | Preparation of Polyurethane Thermoplastic | | | | | | | | | |
|---|---|---|---|---|---|---|---|---|---|---|
|  | 1 | 2 | 3 | 4 | 5 | 6 | 11 | 12 | 13 | 15 |
| MDI, g | — | 34.4 | 82.5 | 103.1 | 133.8 | 131.3 | — | 90.8 | 180.0 | — |
| TDI, g | — | — | — | — | — | — | — | — | — | 45.7 |
| HMDI, g | 137.6 | 108.1 | 86.8 | 36.0 | 15.7 | — | 188.6 | 94.3 | — | — |
| XDI, g | — | — | — | — | — | — | — | — | — | 49.4 |
| PTMG, g | 247.4 | 247.4 | 250.0 | 247.4 | 250.0 | 247.4 | — | — | — | 247.4 |
| PEAD, g | — | — | — | — | — | — | 298.8 | 298.8 | 298.8 | — |
| 1,4BD, g | 22.3 | 22.3 | 33.8 | 22.3 | 28.1 | 22.3 | 39.4 | 45.0 | 39.4 | 22.3 |
| MFA, g | 2.2 | 2.3 | 2.7 | 2.3 | 2.1 | 2.1 | 2.0 | 2.9 | 2.9 | 2.1 |
| T-9, drops | 3 | 3 | 3 | 3 | 3 | 3 | 3 | 3 | 3 | — |
| DBTDL, G | — | — | — | — | — | — | — | — | — | 0.37 |

The addition of stabilizers to the thermoplastic polymers of the invention greatly enhances the aging characteristics with respect to change in yellowness and retention of tensile strength. This may be demonstrated by comparing the DY value and the percent retention of tensile strength (upon aging 200 hours at 25°C in the fluorescent black-light apparatus) for Example 3 with those of an otherwise similar preparation not containing the ultraviolet absorber and antioxidant. The respective values are given in Table III, wherein column A represents Example 3 as previously described and column B represents Example 3 repeated without stabilizers. The data in Table III indicate that the stabilizers at the levels employed cause an improvement in DY value of about 80%, and in the retention of tensile strength an improvement of about 160%.

TABLE III

| Example 3 | Effect of Stabilizers on Change in Yellowness Index and % Retention of Tensile Strength | |
|---|---|---|
|  | A | B |
| Stabilizer | yes | No |
| DY | 5.4 | 26.3 |
| % Retention of Tensile | 69.7 | 26.4 |

EXAMPLES 7-10

In Example 7-10, which are outside the scope of the invention, mechanical blends of one-shot thermoplastic polyether polyurethane made from aliphatic diisocyanate with one-shot thermoplastic polyether polyurethane made from aromatic diisocyanate are prepared, for purposes of comparison with the invention. As indicated in Table IV, Example 7 is a mechanical blend of 75 parts of the aliphatic polyurethane of Example 1 and 25 parts of the aromatic polyurethane of Example 6. To make the blend, 75 g of the granulated polymer of Example 1 and 25 g of the granulated polymer of Example 6 are dry blended, and thereafter 300 g of solvent mixture (70% tetrahydrofuran - 30% cyclohexanone) is added along with stabilizers as in Example 2. The mixture is stirred at room temperature overnight to form a polymer solution. From this solution a film is prepared as described previously. Examples 8, 9 and 10 are similarly carried out, using the proportions shown in Table IV. Determination of the yellowness index change (DY) and retention of tensile strength after aging 200 hours at 25°C in the fluorescent black-light apparatus as previously described produces the results shown in Table I. It will be seen that Examples 9 and 10 produced no improvement in observed DY value as compared to the predicted value, and Examples 7 and 8 actually gave inferior (larger) observed DY values than predicted. This is in remarkable contrast to the synergistic improvements demonstrated in Examples 2-5 of the invention.

TABLE IV

| Ex. Polymer of | Preparation of Mechanical Mixtures of Thermoplastics | | | | |
|---|---|---|---|---|---|
|  | 7 | 8 | 9 | 10 | 14 |
| Ex. 1, g | 75 | 50 | 25 | 10 | — |
| Ex. 6, g | 25 | 50 | 75 | 90 | — |
| Ex.11, g | — | — | — | — | 50 |
| Ex.13, g | — | — | — | — | 50 |

EXAMPLES 11-13

This series of examples compares a one-shot thermoplastic polyester polyurethane prepared solely from aliphatic diisocyanate (control Example 11) and a one-shot thermoplastic polyester polyurethane prepared solely from an aromatic diisocyanate (control Example 13), with a one-shot thermoplastic polyester polyurethane of the invention prepared with both an aliphatic and aromatic diisocyanate (Example 12). The proportions of materials are as indicated in Table II, wherein PEAD indicates the polyester, poly(ethylene adipate) glycol of 95 hydroxyl number. The procedure is otherwise as indicated above for Example 2, and the results are as set forth in Table I, wherein it will again be seen that there is a remarkable synergism in the composition of the invention (Example 12) since the observed DY value is improved 30% over what would have been predicted from the DY values of Examples 11 and 13 (controls).

EXAMPLE 14

Like the mechanically blended one-shot thermoplastic polyether polyurethane (Examples 7-10), a mechanically blended one-shot thermoplastic polyester polyurethane is an utter failure from the standpoint of resistance to yellowing, as is demonstrated in this example, which is outside the invention. In this example the solely aliphatic polyurethane of Example 11 prepared from polyester is blended with the solely aromatic polyurethane of Example 13 prepared from polyester, in equal proportions, as indicated in Table IV, using the procedure described in Example 7. The observed yellowness index change upon aging, DY in Table I, shows that not only is there no improvement in light stability, but there is a great loss (minus 21.1%). From such a negative result with a mechanical blend, it could not have been predicted that use of both aliphatic diisocyanate and aromatic diisocyanate in accordance with the one-shot procedure of the invention would produce a substantial improvement in the thermoplastic product.

EXAMPLE 15

Example 3 is repeated, except that, as is indicated by the Example 15 column of Table II, the aromatic diisocyanate employed is TDI (45.7 g) which is a mixture of 80% 2,4-toluene diisocyanate and 20% 2,6-toluene diisocyanate and the aliphatic diisocyanate employed is XDI (49.4 g) which is a mixture of 70% para-xylylene diisocyanate and 30% meta-xylylene diisocyanate, to give again a 50/50 equivalence ratio of aromatic to aliphatic diisocyanate. As the catalyst, dibutyltin dilaurate (0.37 g, abbreviated DBTDL in Table II) is used in the one-shot procedure. Light aging of the thermoplastic product as previously described produces an observed DY of 11.3 as indicated in Table I, showing that these diisocyanates likewise produce good results in the invention.

EXAMPLE 16

This example, which is included merely for purposes of comparison, is outside the invention since it employs a moisture-cured prepolymer procedure in place of the one-shot procedure of the invention. The recipe for the example is given in Table V. A prepolymer using a 50/50 equivalence ratio of TDI to XDI is prepared and moisture cured for comparison with the thermoplastic of Example 15. The polyol, PTMG (123.7 g), which is the same as that employed in Example 2, is first vacuum stripped for 1 hour at 100°C. A mixture of TDI (22.8 g) and XDI (24.7 g) is then added to the polyol which is maintained at 70°C. At the same time, 3 drops of dibutyltin dilaurate catalyst (DBTDL) is added to the system. After addition of the catalyst and isocyanate mixture, the system is maintained at 80°C. for 4 hours. The reaction mixture is then vacuum stripped for ½ hour for the purpose of degassing the system. The prepolymer is coated on release paper using the same apparatus described in Example 2; however, in this case no solvent is used. The prepolymer film is cured at room temperature by exposure to atmospheric moisture for 1 to 2 days (the moisture produces a curing reaction on the prepolymer, which is reactive since it contains available isocyanate groups). A light stability test is performed on the cured, non-thermoplastic film in the manner previously described, with the result shown in Table I.

Example 17

This example is likewise outside the invention since it involves the moisture-cured prepolymer technique rather than the one-shot thermoplastic method of the invention. The example is carried out according to the procedure of Example 16, with the changes in recipe indicated in Table V.

Inspection of the results for Examples 16 and 17 in Table I reveals that the moisture-cured prepolymer method does not produce the results obtainable with the one-shot thermoplastic method of the invention. Thus, comparing Example 3 of the invention with Example 17 (control), the improvement in light stability amounts to essentially 80%. Likewise Example 15 of the invention using different aromatic and aliphatic diisocyanates TDI and XDI respectively, provides unexpected improvement of about 50% compared to the control mositure-cured prepolymer of Example 16.

TABLE V

| Ex. | Preparation of Polyurethane Prepolymers | |
|---|---|---|
| | 16 | 17 |
| MDI, | — | 31.3 |
| TDI, g | | — |
| HMDI, g | — | 32.8 |
| XDI, g | 24.7 | — |
| PTMG, g | 123.7 | 125.0 |
| DBTDL, drops | 3 | 3 |

EXAMPLE 18

This is an additional control example, outside the scope of the invention, in which a moisture cured prepolymer is prepared essentially according to the teaching of U.S. Pat. No. 3,706,710, Camilleri et al., by sequential reaction, first with aromatic diisocyanate followed by reaction with aliphatic diisocyanate. The recipe is as given in Table VI. 127.0 g of PTMG (described in Example 2) is weighed out and vacuum stripped for 1 hour at 100°C. This polyol is then dissolved in 100 ml. of toluene. At this point, 25.5 g of MDI is added and the mixture is heated to 60°-70°C and maintained at that temperature for one hour under a slow stream of nitrogen. The mixture is then cooled to 55°C and a charge of 39.8 g of HMDI is added. The temperature is increased to 65°-75°C and maintained for 3 hours. The temperature is then allowed to cool to 30°C and 1.5 g of dibutyltin dilaurate (catalyst) is added.

The prepolymer solution is then poured on release paper and passed through a set of steel rollers to give a film as described previously. The film is then subjected to temperatures of 65°C for 15 minutes and 120°C for an additional 15 minutes to remove the toluene after which it is left for about 2 days in the atmosphere to affect a moisture cure through the available isocyanate groups in the prepolymer. Once the material is cured, an evaluation for light stability is carried out as described previously, with the result shown in Table I. It will be noted that the DY value for the Example 18 moisture cured prepolymer (MDI/HMDI ratio 40/60) is substantially higher than (inferior to) that of the polyurethane thermoplastic of the invention in Example 2 (MDI/HMDI ratio 50/50).

EXAMPLE 19

In an attempt to duplicate the prior art moisture cured prepolymer of Example 1 of U.S. Pat. No. 3,706,710, Camilleri et al., for purposes of comparision with the one-shot thermoplastic of the invention, the procedure of that example was followed, using the recipe shown in Table VI. The materials employed were as described in Camilleri et al., Example 1, except that in place of the Camilleri et al. polyester (from 1,6-hexanediol, adipic and isophthalic acids; molecular weight 1500) there was employed a poly(ethylene adipate) glycol of 95 hydroxyl number, molecular weight 1190 (designated PEAD in Table VI). To preserve Camilleri et al's ratio of isocyanate to hydroxyl, 239 g of this polyester was used, dissolved in 124 g of methyl ethyl ketone and 124 g of xylol. 8.7 g of TDI was added to the polyester solution, and the solution was heated at 60°–70°C. for one hour. The solution was then cooled to 55°C and 43.1 g of HMDI added. The mixture was heated at 65°–75°C for three hours, then allowed to cool to 30°C and 1.2 g of dilutyltin dilaurate (DBTDL) was added. Evaporation of the solvent gave a gummy, sticky and useless material which even after having been exposed to moisture for 14 days did not change its consistency. It was therefore not possible to carry out any meaningful light stability evaluation on the material.

TABLE VI

| Ex. | Preparation of Polyurethane Prepolymer (according to U.S. 3,706,710) | |
|---|---|---|
| | 18 | 19 |
| MDI, g | 25.5 | — |
| TDI, g | — | 8.7 |
| HMDI, g | 39.8 | 43.1 |
| PTMG, g | 127.0 | — |
| PEAD, g | — | 239.0 |
| DBTDL, g | 1.5 | 1.2 |

EXAMPLE 20

Preparation of a light-stable foam by the one-shot method using a mixture of aliphatic and aromatic diisocyanates in accordance with the invention may be undertaken by mixing 100 g of propoxylated N-aminoethyl-piperazine (a polyether polyol with a functionality of 3; hydroxyl number 520; see U.S. Pat. No. 3,251,788, Carrier et al., May 17, 1966), 2 g of organosilicone surfactant (e.g. siloxane-oxyalkylene block copolymer, U.S. Pat. No. 3,377,296, Dwyer et al., Apr. 9, 1968, col. 6, l. 29–37), and 45 g trichlorofluoromethane with vigorous stirring at room temperature. Then 1 g of catalyst [1,4-diaza(2,2,2)bicyclooctane, 33% active] is added with stirring, followed by 140 g of the diisocyanate mixture (68.1 g of MDI and 71.4 g of HMDI). The reaction mixture is subsequently poured into a mold and allowed to cure at room temperature. The cured material is a rigid off-white foam.

We claim:

1. A light stable solid thermoplastic polyurethane composition comprising a one-shot reaction product of a macropolyol and a mixture of an aromatic polyisocyanate and an aliphatic polyisocyanate, the equivalence ratio of aromatic to aliphatic polyisocyanate being 50:50, and the overall isocyanate to hydroxyl ratio being from 1:1 to 1.1:1 whereby the solid thermoplastic polyurethane is substantially devoid of free isocyanate groups, the said aromatic polyisocyanate being methylenebis(4-phenylisocyanate) and the said aliphatic polyisocyanate being methylenebis(4-cyclohexylisocyanate).

2. A light stable solid thermoplastic polyurethane composition comprising a one-shot reaction product of (a) a macropolyol, (b) a low molecular weight polyol chain extender and (c) a mixture of aromatic polyisocyanate and aliphatic polyisocyanate, the equivalence ratio of aromatic to aliphatic polyisocyanate being 50:50, and the overall isocyanate to hydroxyl ratio being from 1:1 to 1.1:1 whereby the solid thermoplastic polyurethane is substantially devoid of free isocyanate groups, the said aromatic polyisocyanate being methylenebis(4-phenylisocyanate) and the said aliphatic polyisocyanate being methylenebis(4-cyclohexylisocyanate.

3. A light stable solid thermoplastic polyurethane composition comprising a one-shot reaction product of (a) a macropolyol having an equivalent weight of from 100 to 2000 and an hydroxyl number of from 200 to 600 selected from the group consisting of polyether polyols and polyester polyols, (b) a low molecular weight glycol chain extender and (c) a mixture of aromatic diisocyanate and aliphatic diisocyanate, the overall isocyanate to hydroxyl molar ratio being from 1:1 to 1.1:1, the equivalence ratio of aromatic to aliphatic isocyanate being 50:50, and the equivalence ratio of chain extender (b) to macropolyol (a) being from 1:1 to 2:1, the solid thermoplastic polyurethane being substantially devoid of free isocyanate groups, the said aromatic diisocyanate being methylenebis(4-phenylisocyanate) and the said aliphatic diisocyanate being methylenebis(4-cyclohexylisocyanate).

4. A light stable solid thermoplastic polyurethane composition as in claim 3 in which the said macropolyol is poly (oxytetramethylene)glycol.

5. A light stable solid thermoplastic polyurethane composition as in claim 3 in the form of a coating on a fabric.

6. A method of making a solid light stable thermoplastic polyurethane by a one-shot reaction comprising mixing a polyol with a blend of an aromatic polyisocyanate and an aliphatic polyisocyanate, the molar ratio of isocyanate to hydroxyl being within the range of from 1:1 to 1.1:1, the equivalence ratio of aromatic to aliphatic polyisocyanate being 50:50, and subjecting the mixture to a temperature within the range of from 25°C to 200°C, whereby there is formed a solid thermoplastic polyurethane substantially devoid of free isocyanate groups, the said aromatic polyisocyanate being methylenebis(4-phenylisocyanate) and the said aliphatic polyisocyanate being methylenebis(4-cyclohexylisocyanate).

7. A method of making a light stable thermoplastic polyurethane comprising mixing (a) a polyester or polyether polyol having an equivalent weight of from 100 to 3000 and an hydroxyl number from 20 to 600, (b) a low molecular weight glycol chain extender and (c) a mixture of aromatic diisocyanate and aliphatic diisocyanate, the overall isocyanate to hydroxyl molar ratio being from 1:1 to 1.1:1, the equivalence ratio of aromatic to aliphatic isocyanate being 50:50 and the equivalence ratio of chain extender (b) to polyol (a) being from 1:1 to 2:1, and subjecting the mixture of (a), (b) and (c) to a temperature of from 50° to 150°C whereby a solid thermoplastic polyurethane substantially devoid of free isocyanate groups is formed by a one-shot reaction, the said aromatic diisocyanate being methylenebis(4-phenylisocyanate) and the said aliphatic diisocyanate being methylenebis(4-cyclohexylisocyanate).

8. A method of making a coated fabric, coated with a light stable solid thermoplastic polyurethane, comprising mixing (a) a polyester or polyether polyol having an equivalent weight of from 500 to 2000 and an hydroxyl number of from 30 to 120, (b) a low molecular weight glycol chain extender and (c) a blend of aromatic diisocyanate and aliphatic diisocyanate, the overall isocyanate to hydroxyl molar ratio being from 1:1 to 1.1:1, the equivalence ratio of aromatic to aliphatic isocyanate being 50:50, and the equivalence ratio of chain extender (b) to polyol (a) being from 1:1 to 2:1, and subjecting the mixture of (a), (b) and (c) to a temperature of from 50° to 150°C. whereby a solid thermoplastic polyurethane substantially devoid of free isocyanate groups is formed by a one-shot reaction, and coating a fabric with the resulting light stable solid thermoplastic polyurethane, the said aromatic diisocyanate being methylenebis(4-phenylisocyanate) and the said aliphatic diisocyanate being methylenebis(4-cyclohexylisocyanate).

9. A method as in claim 2 in which the said polyol is poly(oxytetramethylene) glycol.

* * * * *

UNITED STATES PATENT AND TRADEMARK OFFICE
CERTIFICATE OF CORRECTION

PATENT NO. : 3,925,319

DATED : Dec. 9, 1975

INVENTOR(S) : Norman A. Hiatt et al.

It is certified that error appears in the above-identified patent and that said Letters Patent are hereby corrected as shown below:

Column 16, line 11, for the claim reference numeral "2" read --8--.

Signed and Sealed this

Tenth Day of August 1976

[SEAL]

Attest:

RUTH C. MASON
Attesting Officer

C. MARSHALL DANN
Commissioner of Patents and Trademarks